US012272242B2

(12) United States Patent
Tian et al.

(10) Patent No.: US 12,272,242 B2
(45) Date of Patent: Apr. 8, 2025

(54) SYSTEMS AND METHODS FOR USE IN DETERMINING PARKING SPOT ALLOCATION

(71) Applicants: Honda Motor Co., Ltd., Tokyo (JP); University of Central Florida Research Foundation, Inc., Orlando, FL (US)

(72) Inventors: Danyang Tian, Ann Arbor, MI (US); Ehsan Moradi Pari, Ann Arbor, MI (US); Xue Bai, Novi, MI (US); Yaser Pourmohammadi Fallah, Oviedo, FL (US); Ghayoor Shah, Orlando, FL (US); Shahriar Shahram, Orlando, FL (US)

(73) Assignees: Honda Motor Co., Ltd., Tokyo (JP); University of Central Florida Research Foundation, Inc., Orlando, FL (US)

( * ) Notice: Subject to any disclaimer, the term of this patent is extended or adjusted under 35 U.S.C. 154(b) by 23 days.

(21) Appl. No.: 18/191,630

(22) Filed: Mar. 28, 2023

(65) Prior Publication Data
US 2024/0331539 A1    Oct. 3, 2024

(51) Int. Cl.
*G08G 1/14*        (2006.01)
*H04W 4/44*        (2018.01)

(52) U.S. Cl.
CPC .............. *G08G 1/141* (2013.01); *G08G 1/146* (2013.01); *H04W 4/44* (2018.02)

(58) Field of Classification Search
CPC ......... H04W 4/027; H04W 4/06; H04W 4/46; H04W 4/48; H04W 56/0035; H04W 64/006; H04W 72/0446; H04W 72/30; H04W 74/0816; H04W 76/14; H04W 76/40; H04W 4/44; H04L 5/0091; H04J 3/1694; G06V 20/54; G06V 20/584; G06V 20/586; G06N 5/04; G05D 1/0088; G05D 1/0212; G05D 1/0278; G01S 5/0027; G01C 21/26; G01C 21/3658; G01C 21/3685; G01C 21/3822; B62D 15/0285; B60W 10/06; B60W 10/18; B60W 10/20;
(Continued)

(56) References Cited

U.S. PATENT DOCUMENTS

7,239,252 B2    7/2007    Kato
8,995,662 B2    3/2015    Rubin
(Continued)

*Primary Examiner* — Dionne Pendleton
(74) *Attorney, Agent, or Firm* — Armstrong Teasdale LLP (57) ABSTRACT

A system for use in determining parking spot allocation. The system includes a host vehicle parked in a host parking spot. The host vehicle includes a transceiver configured for vehicle-to-vehicle communication, and a control unit configured to determine the host vehicle is ready to depart the host parking spot, receive, via the transceiver, a first signal from at least one client vehicle, wherein the first signal indicates the at least one client vehicle is searching for a parking spot, allocate the host parking spot to a first client vehicle of the at least one client vehicle; and transmit, via the transceiver, a second signal to the first client vehicle, wherein the second signal notifies the first client vehicle that the host parking spot has been allocated to the first client vehicle, and provides location data associated with the host parking spot to the first client vehicle.

18 Claims, 3 Drawing Sheets

(58) Field of Classification Search
CPC .............. B60W 2556/50; B60W 50/14; B60R
2325/205; B60R 25/33; G08G 1/143;
G08G 1/146; G08G 1/144; G08G 1/0112;
G08G 1/0116; G08G 1/0133; G08G
1/0141; G08G 1/04; G08G 1/09; G08G
1/096791; G08G 1/0969; G08G 1/142;
G08G 1/148; G08G 1/16; G08G 1/161;
G08G 1/163; G08G 1/166; G08G 1/167;
G08G 1/20; G08G 1/205; G08G 9/02;
G08G 1/141; G06Q 10/02
See application file for complete search history.

(56) References Cited

U.S. PATENT DOCUMENTS

| | | | |
|---|---|---|---|
| 9,852,628 B2 | 12/2017 | Hakeem et al. | |
| 10,459,442 B1 | 10/2019 | Hayes et al. | |
| 2005/0195095 A1* | 9/2005 | Kato | G08G 1/143 |
| | | | 340/901 |
| 2015/0039211 A1* | 2/2015 | Stefan | B62D 15/0285 |
| | | | 701/117 |
| 2017/0025008 A1 | 1/2017 | Gignac et al. | |
| 2019/0213428 A1 | 7/2019 | Koravadi | |
| 2020/0379079 A1* | 12/2020 | Dupray | H04W 64/00 |

* cited by examiner

SYSTEMS AND METHODS FOR USE IN DETERMINING PARKING SPOT ALLOCATION

BACKGROUND

The present disclosure relates generally to vehicle-to-vehicle communication between automobiles and, more specifically, to systems and methods used to communicate parking spot allocation to drivers in vehicles searching for a parking spot.

In many known heavily trafficked population centers and/or commercial establishments, parking spots may be limited, at a premium, and/or are available only on a first-come/first-serve basis. At peak times throughout the day, the limited number of available parking spots may cause motorists to drive extensively and/or circle about the parking lot in search of an available spot. This may increase the anxiety and/or frustration of motorists that are having difficulty in finding a spot and those delayed in reaching their destination. Moreover, as the frustration and anxiety levels increase amongst the drivers seeking and competing for available parking spaces, some drivers may experience a degree of "road rage" and begin to drive recklessly and/or aggressively as parking spaces become available.

BRIEF DESCRIPTION

In one aspect, a system for use in determining parking spot allocation is provided. The system includes a host vehicle parked in a host parking spot. The host vehicle includes a transceiver configured for vehicle-to-vehicle communication, and a control unit configured to determine the host vehicle is ready to depart the host parking spot; receive, via the transceiver, a first signal from at least one client vehicle, wherein the first signal indicates the at least one client vehicle is searching for a parking spot; allocate the host parking spot to a first client vehicle of the at least one client vehicle; and transmit, via the transceiver, a second signal to the first client vehicle, wherein the second signal notifies the first client vehicle that the host parking spot has been allocated to the first client vehicle, and provides location data associated with the host parking spot to the first client vehicle.

In another aspect, a system for use in determining parking spot allocation is provided. The system includes a client vehicle including a transceiver configured for vehicle-to-vehicle communication, and a control unit configured to determine the client vehicle is searching for a parking spot, transmit, via the transceiver, a first signal to a host vehicle parked in a host parking spot, wherein the first signal notifies the host vehicle that the client vehicle is searching for a parking spot, receive, via the transceiver, a second signal from the host vehicle, wherein the second signal notifies the client vehicle the host parking spot is allocated to the client vehicle, and transmit, via the transceiver, a third signal to the host vehicle, wherein the third signal provides acknowledgement to the host vehicle that the parking spot allocation is accepted by the client device.

In yet another aspect, a system for use in determining parking spot allocation is provided. The system includes a host vehicle parked in a host parking spot. The host vehicle includes a transceiver configured for vehicle-to-vehicle communication, and a control unit configured to receive, via the transceiver, a first signal from at least one client vehicle, wherein the first signal indicates the at least one client vehicle is searching for a parking spot, allocate the host parking spot to a first client vehicle of the at least one client vehicle; and transmit, via the transceiver, a second signal to the first client vehicle, wherein the second signal notifies the first client vehicle that the host parking spot has been allocated to the first client vehicle, and provides location data associated with the host parking spot to the first client vehicle.

DETAILED DESCRIPTION

The systems and methods described herein facilitate control and communication between vehicles to allocate recently vacated parking spots to client vehicles in search of a parking spot. In the scenarios described herein, a host vehicle communicates with other vehicles that are client vehicles that are in proximity to the host vehicle and that are in search of an available parking spot. For example, the host vehicle can send a message to the other vehicles to indicate that the parking spot occupied by the host vehicle is about to be available. Any or all of client vehicles receiving the message from the host vehicle, can send a reply confirming a desire for the host vehicle's spot, and the host vehicle can determine which client vehicle is entitled to the spot based on any number of pre-defined criteria. The selected client vehicle may then be provided with the location of the host vehicle's parking spot. Accordingly, the systems and methods described herein facilitate directing vehicle traffic in highly trafficked areas, such as locations having parking spots, in an efficient and controlled manner that facilitates reducing stress and anxiety.

Figure 1:
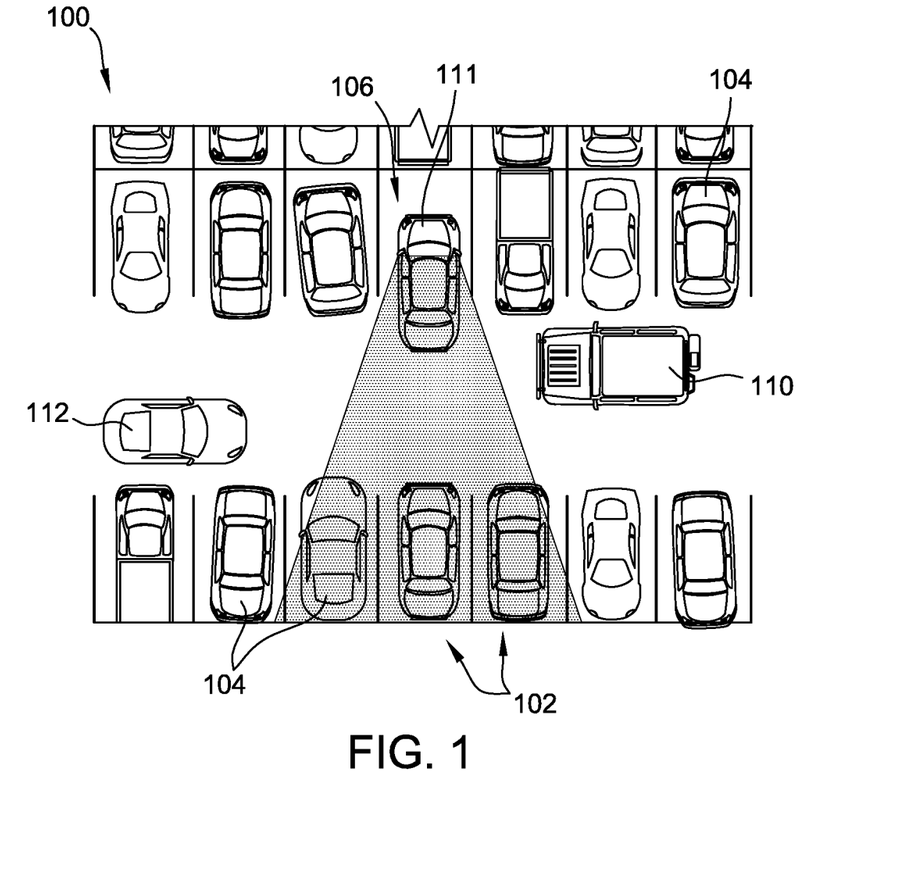
FIG. 1 illustrates an exemplary parking scenario.

Referring now to the drawings, FIG. 1 is an illustrative example of a parking scenario, specifically, within a parking lot 100. The parking lot 100 includes a plurality of parking spots 102, and a plurality of parked vehicles 104 within parking spots 102. For example, a host vehicle 111 parked in a host parking spot 106 is preparing to back out of and vacate the spot 106 and leave parking lot 100. As illustrated, a first client vehicle 110 and at least a second client vehicle 112 are driving through parking lot 100 in search of an available/unoccupied parking spot 102. Although illustrated as a parking lot with lines defining parking spots positioning vehicles side by side, the invention described herein is also applicable to multi-level parking garages, parallel parking spots located adjacent to a roadway, and/or any other parking situation where a user searching for an available parking spot would benefit from receiving information about an available, or soon to be available, parking spot.

In the exemplary embodiment, there are a limited number of parking spots 102 within parking lot 100. Such parking spots 102 typically only become available on a first-come/first-serve basis. Accordingly, as can be easily imagined, in some situations, it may be difficult to determine which client vehicle 110 or 112, for example, should be entitled to host parking spot 106, especially if client vehicles 110 and 112 arrive in the vicinity of host parking spot 106 at approximately the same time, or arrive at the intersection first. Similarly, it may be difficult to determine which vehicle has the right of way at an intersection, for example. This may lead to ambiguity for the drivers of both client vehicles 110 and 112 as to which vehicle is entitled to host parking spot 106. Accordingly, the systems and methods described herein facilitate communication between parked vehicles and searching vehicles to assist in such parking scenarios.

Figure 2:
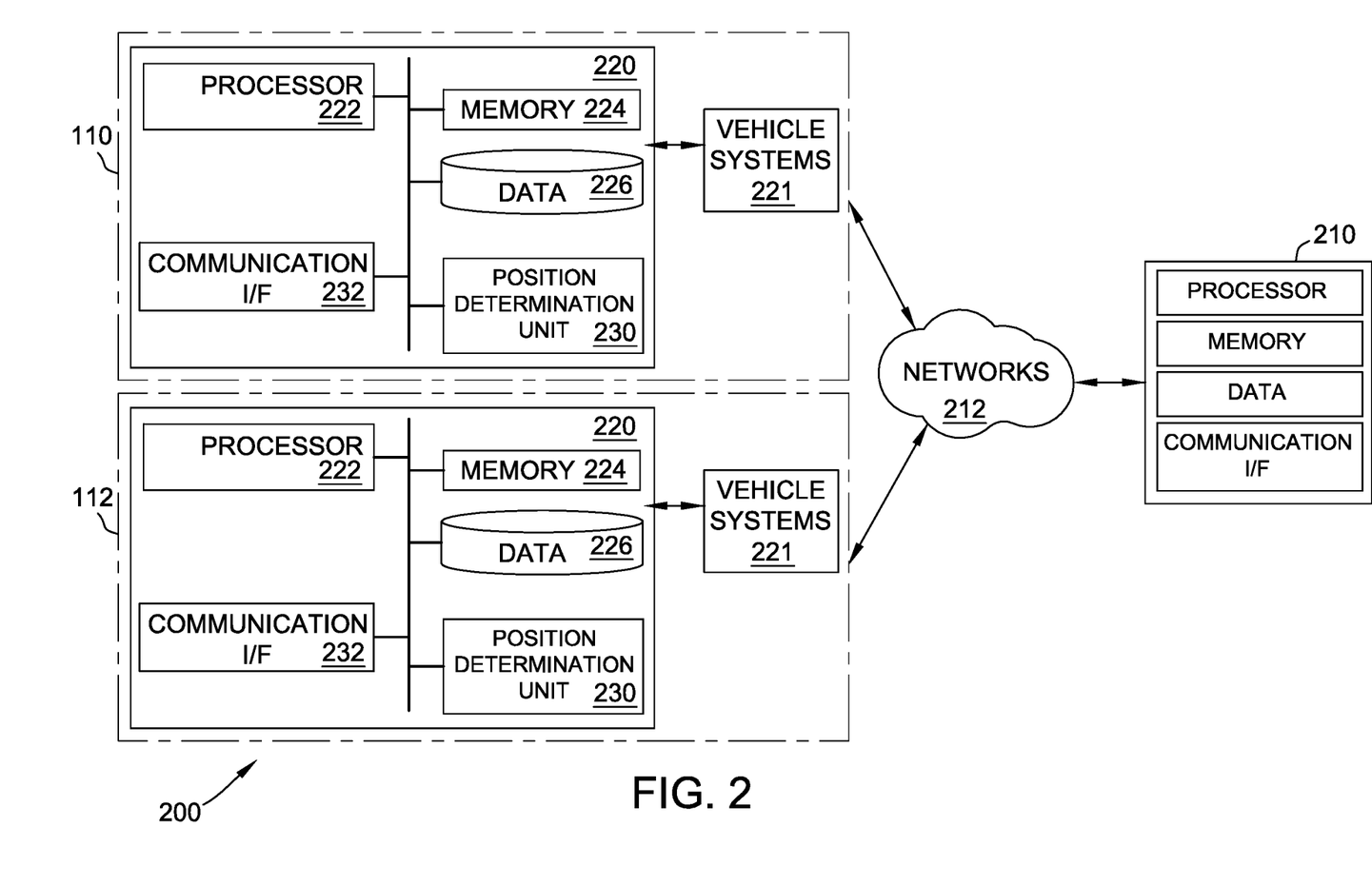
FIG. 2 is a schematic illustration of an exemplary parking spot allocation system.

Referring now to FIG. 2, an exemplary system 200 for use in determining parking spot allocation is shown. The allocation system 200 can be implemented using any of the references described in FIG. 1 and in any other parking spot allocation scenario. For convenience, identical names and numerals are used in FIG. 2 to identify the same components/references identified in FIG. 1. In the exemplary embodiment, host vehicle 111, client vehicle(s) 110 and/or 112, and a remote server 210, are each operatively coupled together to enable direct or indirect communication therebetween. For example, any of vehicles 111, 110, and/or 112 may communicate with each other via a network 212 or may be capable of communicating directly with each other via a wireless network (not shown). For simplicity, only a single host vehicle 111 and a pair of client vehicles 110 and 112 are illustrated, and additional host vehicles and client vehicles are not illustrated in FIG. 2. However, it should be understood that additional vehicles can include any of the components and/or functions described herein with respect to vehicles 111, 110, and/or 112. Further, it should be understood that the components of vehicles 111, 110, and/or 112, and the remote server 210 as well as the components of other systems, hardware architectures, and software architectures discussed herein, can be combined, omitted, or organized into different architectures for various embodiments, without changing the scope of the invention.

In the exemplary embodiment, host vehicle 111 and client vehicles 110 and 112 each include a control unit or controller 220 and a vehicle systems 221. Generally, controller 220 includes a processor 222, a memory 224, a data storage 226, a position determination unit 230, and a communication interface (I/F) (i.e., a transceiver) 232, all of which are operably connected for communication via a bus and/or other wired and wireless technologies discussed herein. Controller 220 can include provisions for processing, communicating, and interacting with various components its respective vehicle and other components of system 200, including any other vehicles within communicative proximity, and remote server 210.

Processor 222 includes logic circuitry with hardware, firmware, and software architecture frameworks that enable processing by host vehicle 111, and that facilitate communication between vehicles 111, 110, and 112, and between any of vehicles 111, 110, and 112 and remote server 210. Processor 222 is programmed with an algorithm that enables prioritization of a parking spot 106, as described in more detail below. Thus, in some embodiments, processor 222 can store application frameworks, kernels, libraries, drivers, application program interfaces, among others, to execute and control hardware and functions discussed herein. In some embodiments, memory 224 and/or the data storage (e.g., a disk) 226 can store similar components as processor 222 for execution by processor 222.

In the exemplary embodiment, position determination unit 230 includes hardware (e.g., sensors) and software to determine and/or acquire position data about its respective vehicle. For example, position determination unit 230 can include a global positioning system (GPS) unit (not shown) and/or an inertial measurement unit (IMU) (not shown). Thus, position determination unit 230 can provide location data (e.g., a geoposition) associated with any of vehicles 111, 110, and/or 112 based on satellite data received from, for example, a global position source unit 240, or from any Global Navigational Satellite infrastructure (GNSS), including, but not limited to GPS, Glonass (Russian) and/or Galileo (European). Further, position determination unit 230 can provide dead-reckoning data or motion data from, for example, a gyroscope, accelerometer, magnetometers, among other sensors (not shown). In some embodiments, position determination unit 230 can be a navigation system that provides navigation maps, map data, and navigation information to client vehicles 110 and 112 to facilitate navigation towards host parking spot 106 (shown in FIG. 1), for example.

Communication interface (I/F) 232 can include software and hardware to facilitate data input and output between the components of controller 220 and other components of system 200. Specifically, communication I/F 232 can include network interface controllers (not shown) and other hardware and software that manages and/or monitors connections and controls bi-directional data transfer between communication I/F 232 and other components of system 200 using, for example, network 212. In particular, communication I/F 232 can facilitate communication (e.g., exchange data and/or transmit messages) with other vehicles and/or devices, using any type of communication hardware and/or protocols discussed herein. For example, the computer communication can be implemented using a wireless network antenna (e.g., cellular, mobile, satellite, or other wireless technologies) or road-side equipment (RSE) 000 (e.g., Dedicated Short Range Communications or other wireless technologies), and/or network 212. Further, communication I/F 232 can also include input/output devices associated with the respective vehicle, such as a mobile device. In some embodiments described herein, communication between vehicles can be facilitated by displaying and/or receiving communication on a display within the respective vehicle.

Vehicle systems 221 can include any type of vehicle control system and/or system described herein to enhance the driving experience of vehicles 111, 110, and/or 112. For example, vehicle systems 221 can include user interface systems, autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS).

Figure 3:
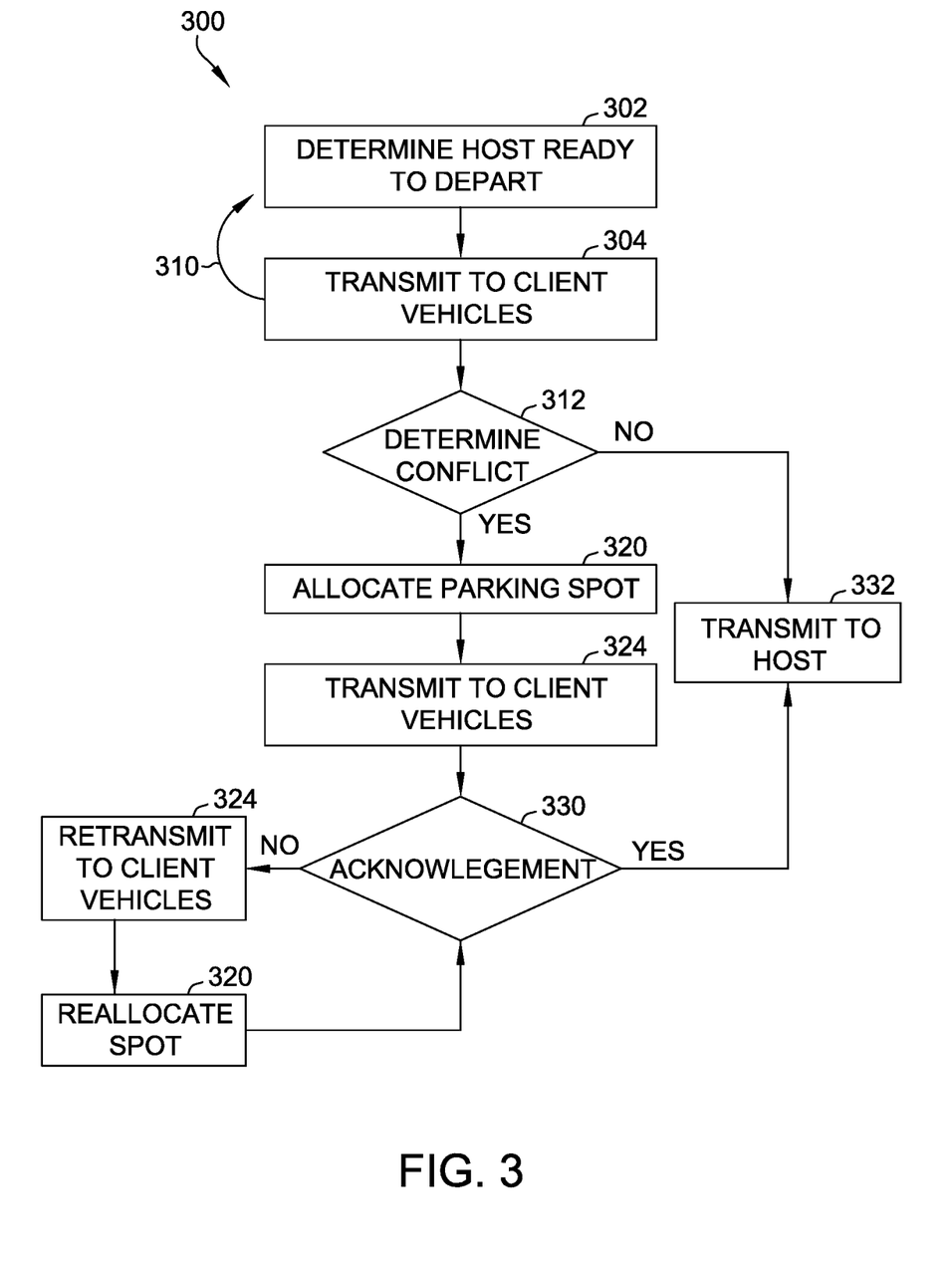
FIG. 3 is a flow diagram illustrating an exemplary method of determining parking spot allocation.

With reference to FIG. 3, an exemplary method 300 that may be implemented to allocate a host parking spot, such as spot 106, to any of client vehicles 110 and/or 112, for example. In the exemplary embodiment, method 300 is described using the operations of one or more components illustrated in FIGS. 1 and 2, such as controller 220 in host vehicle 111 and/or client vehicles 110 and/or 112. Although FIG. 3 is described with respect to three vehicles 111, 110, and 112, the methods and systems described herein can be applied to any number of vehicles. It should also be understood that the parking lot 100 associated with system 200 and method 300 may include multiple client parking spots 106 as well as parking spots 102 that are not associated with system 200.

Initially, in the exemplary embodiment, system 200 determines 302 that host vehicle 111 is ready to depart host parking spot 106. In the exemplary embodiment, only after determining 302 that host parking spot 106 will become available in the near future, does system 200 begin to allocate host parking spot 106 to a different occupant. Alternatively, and as described in more detail below, system 200 may be initiated as client vehicles 110 and 112 either enter a parking lot 100 associated with system 200 and/or is initiated only when receiving an input from client vehicles 110 and/or 112 are searching for a parking spot 106 in a parking lot 100 associated with system 200.

In the exemplary embodiment, system 200 determines 302 that host vehicle 111 is ready to depart based on a manual input from a passenger or driver of host vehicle 111. For example, the manual input may be received on vehicle system 221 of host vehicle 111, or alternatively, may be input to system 200 via a mobile device associated with a passenger of vehicle 111 or driver of vehicle 111. Alternatively, system 200 may determine 302 that host vehicle 111 is ready to depart in an automated manner, such as by monitoring when host vehicle 111 is activated (i.e, engine is running), monitoring an amount of time in which host vehicle 111 has been activated, and/or monitoring predetermined changes in the driving mode of host vehicle 111. For example, such monitoring may be used to identify when host vehicle 111 is activated, when host vehicle is shifted from a park mode to any other vehicle mode that enables host vehicle 111 to move (e.g., vehicle is shifted into a drive mode or a reverse mode), or when host vehicle 111 has been activated for longer than a predetermined amount of time, it may be assumed that host vehicle 111 is ready to depart host parking spot 106, and controller 220 advances through method 300.

In some embodiments, system 200 may determine 302 that host vehicle 111 is ready to depart based on vehicle 111 receiving an indication from an application on a mobile device associated with either a driver of vehicle 111 or a designated passenger of vehicle 111. In such an embodiment, the indication that host vehicle 111 is ready to depart may be transmitted by the mobile device and/or received by the host vehicle 111 from a location remote from the host vehicle (i.e., prior to the driver or passenger entering the host vehicle 111). For example, a driver exiting a mall and walking to the host vehicle 111 may transmit via a mobile device that host vehicle 111 is ready to depart. As a result, other client vehicles may wait near the host vehicle 111 and designated parking spot 106 rather than driving around in search of an available parking spot 102.

In the exemplary embodiment, after determining 302 that parking spot 106 is about to become vacated, system 200 causes host vehicle 111 to transmit 304 a signal to any client vehicles 110 and/or 112, for example, that are determined to be within a predefined distance from host parking spot 106. This signal informs client vehicles 110 and 112 that a host parking spot 106 is about to become available, or is already available. Alternatively, system 200 may be programmed to identify client vehicles 110 and/or 112 searching for a parking spot 106 within a parking lot 100 associated with system 200 prior to determining 302 that parking spot 106 is about to become vacated. For example, in such an alternative embodiment, system 200 may identify any client vehicles 110 and/or 112 entering the parking lot 100 associated with system 200 based on monitoring a relative location of vehicles 110 and/or 112, based on monitoring an amount of time or distance traveled (i.e., monitoring a location of vehicle 110 and/or 112 relative to the parking lot 100) a client vehicle 110 and/or 112 is within the parking lot 100 but is not within a designated client parking spot 106, and/or based on a manual input from a passenger or driver associated with client vehicle 110 and/or 112 (i.e., analogous to "call-ahead reservations").

After transmitting 304 a signal to client vehicles 110 and/or 112, in the exemplary embodiment, host vehicle 111 waits for acknowledgement from one or more client vehicles 110 and/or 112 that either client vehicle 110 and/or 112 is searching for a parking spot within the parking lot 100 associated with system 200. More specifically, in the exemplary embodiment, acknowledgement from a client vehicle 110 and/or 112 involves system 200 receiving 310 a first signal transmitted from at least one client vehicle 110 and/or 112 indicating that the client vehicle 110 and/or 112 is searching for a parking spot. The transmission of the first signal may be initiated manually by the driver or a passenger associated with the client vehicle 110 and/or 112 searching for a parking spot. Alternatively and/or in addition, the transmission of the first signal may be transmitted automatically from each client vehicle 110 and/or 112 as each vehicle 110 and/or 112 enters the parking lot 100 associated with system 200, after the vehicle 110 and/or 112 has traveled a predetermined distance through the parking lot 100 associated with system 200 without entering a client parking spot 106, and/or after the vehicle 110 and/or 112 has been within the parking lot 100 for a predetermined amount of time without entering a client parking spot 106.

Initially after receiving 310 an acknowledgement from at least one client vehicle 110 and/or 112, system 200 determines 312 if more than one client vehicle 110 and 112 is searching for a parking spot, i.e., client vehicles 110 and 112 are each looking for a spot and are thus "competing" for a vacate client parking spot 106. Generally, if two or more client vehicles 110 and 112 are competing for a client parking spot 106, after receiving 310 the first signal, system 200 allocates 320 the host parking spot 106 to one of the client vehicles 110 or 112 searching for a parking spot.

To allocate 320 the parking spot 106, system 200 transmits 324 a second signal to the client vehicles 110 and 112 that the host parking spot 106 has been allocated 320 to that vehicle 110 or 112 and provides location data associated with the host parking spot 106 to that vehicle 110 or 112. If the client vehicle 110 or 112 still wants to occupy the client parking spot 106, a third signal is transmitted 330 from that vehicle 110 or 112 to system 200 acknowledging acceptance of the host parking spot allocation 320. In the exemplary embodiment, after receiving the third signal, system 200 provides 332 an indication to the host vehicle 111 that they may vacate the client parking spot 106. If system 200 does not receive an acknowledgement transmitted 330 from the selected vehicle 110 or 112, then system 200 retransmits 324 second signal to the client vehicles 110 and 112 that the host parking spot 106 is being allocated 320 to a different vehicle. In some embodiments, system 200 will re-allocate 320 the client parking spot 106 after system 200 has not received an acknowledgement transmitted 330 within a pre-determined amount of time.

In the exemplary embodiment, to facilitate reducing confusion or conflict, as well as to facilitate optimizing the efficiency of system 200, regarding which vehicle should enter client parking spot 106, system 200 does not provide an indication to the host vehicle 111 that they may vacate the client parking spot 106 until after the host parking spot 106 has been allocated 320 to a client vehicle 110 or 112. In some situations, client vehicles 110 and/or 112 are not "competing" for client parking spot 106, i.e., situations where additional client parking spots 106 are available for occupancy, situations where other parking spots are available, and/or situations where only one client vehicle 110 or 112 is searching for a parking spot. In such non-compete situations, after system 200 has determined 312 that no vehicles are competing for client parking spot 106, system 200 provides 332 an indication to the host vehicle 111 that they may vacate the client parking spot 106 without delay. Method 300 is repeated until no vehicles remain searching for parking spots 106.

In the exemplary embodiment, during allocation 320 of vehicles, system 200 generates a priority listing of vehicles 110 and 112 that are searching for a client parking spot 106. System 200 does not merely allocate 320 the client parking spot 106 based on the response time of an acknowledgement received 310 from at least one client vehicle 110 and/or 112 that the vehicle 110 and/or 112 is searching for a parking spot i.e., a first come, first served approach. Rather, system 200 includes an algorithm that prioritizes the allocation 320 amongst multiple client vehicles 110 and 112. Basically, system 200 generates a priority order list based on several factors including, but not limited to, the relative distances between each vehicle 110 and 112 and the newly available client parking spot 106, and/or based on the direction of travel of the vehicles 110 and 112 i.e., the side of the street or parking structure on which the vehicle 110 or 112 will be approaching the parking spot 106. In addition, the algorithm may also be programmed to direct vehicles 110 and/or 112 searching for an available parking spot 106 to the closest available parking spot 106, to direct vehicles 110 and/or 112 to the easiest spot for the driver to park (i.e., if parallel parking is necessary, accept the request of a vehicle driving on the same side of the road as the parking spot, same for diagonal parking spots), and/or other factors designed to facilitate most efficiently parking all vehicles 110 and/or 112 searching for available parking spots 106.

Other priority factors may include a consideration of the urgency level of competing vehicles 110 and/or 112. In some embodiments, the urgency level may be determined based on the average speed of the vehicle 110 and/or 112 in the parking lot 100 and/or objective data of the competing vehicles. Such objective data may be an inference of the urgency of the vehicle determined by system 200 based on monitored actions of the vehicle 110 and/or 112, and/or subjective data input by a driver of the vehicle 110 and/or 112, such as an input that an emergency exists and they need a spot sooner, or an input that the driver will only be in the spot 106 for a short time duration. Other prioritization factors may involve an estimation of the arrival time of each competing vehicle 110 and/or 112, as input by the driver of the vehicle, and/or a list of preferences provided by the driver such as but not limited to a desire not to parallel park, or a desire to park closer to one end of a parking lot 100 rather than the other end, or a need to park near a handicap accessible sidewalk or door.

Furthermore, in some embodiments, system 200 can be programmed to consider whether the driver of a competing vehicle is the colleague of a driver of another vehicle and as such expresses a desire to park near the other vehicle. In such embodiments, system 200 can allocate 320 the parking spots 106 such that the two vehicles don't need to continue to drive around in a crowded parking lot 100, but rather the second vehicle can wait near their colleague's car until a near-by parking space becomes available.

In some situations, based on the priority factors, system 200 may allocate 320 a parking spot 106 to a second client vehicle over a first client vehicle, even if the second client vehicle is "ranked lower" on the initial priority list generated by system 200.

In some embodiments, host vehicle 111 and client vehicles 110 and 112 are enrolled in a service, such as through a subscription, that implements parking spot control and allocation and that provides the functionality described herein. In this service, as in each of the embodiments described herein, all vehicles "participating" in the service can communicate with every other vehicle utilizing the allocation service (via a communication interface 232 associated with vehicle, for example, or via an application on each respective user's mobile device), to facilitate optimizing the efficiency of the allocation and control system.

The embodiments described herein relate generally to systems and methods to facilitate control and communication between vehicles to allocate recently available parking spots to client vehicles in search of a parking spot. In the exemplary embodiments, a host vehicle communicates with other client vehicles that are in search of an available parking spot prior to the host vehicle vacating the parking spot. Any or all of client vehicles receiving the message from the host vehicle, can confirm desire to occupy the host vehicle's parking spot, and the system can determine which client vehicle is entitled to the spot based on any number of pre-defined criteria. Accordingly, the systems and methods described herein facilitate directing vehicle traffic in highly trafficked areas, such as locations having parking spots, in an efficient and controlled manner that facilitates reducing stress and anxiety.

Exemplary embodiments of a parking spot control and allocation system are described above in detail. Although the parking spot control and allocation system herein is described and illustrated in association with automobiles in a parking lot, the system could be used with to allocate other spaces, including slips at a marina, and/or trucks at a loading dock, for example. The invention is also intended for use in allocating space for other vehicles, but not limited to including a fleet of delivery vehicles at a loading facility. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in determining parking spot allocation, the system comprising:
 a host vehicle occupying in a host parking spot, the host vehicle comprising:
 a transceiver configured for vehicle-to-vehicle communication; and
 a control unit configured to:
 determine the host vehicle is ready to depart the host parking spot;
 receive, via the transceiver, a first signal from each of a plurality of client vehicles, wherein the first signal indicates the at least one client vehicle is searching for a parking spot;
 determine a parking priority listing for the plurality of client vehicles based on at least one of an estimated time of arrival to the host parking spot and an order in which the first signal is received from each client vehicle;

allocate the host parking spot to a first of the plurality of client vehicle vehicles based on the parking priority ranking; and transmit, via the transceiver, a second signal to the first client vehicle, wherein the second signal notifies the first client vehicle that the host parking spot has been allocated to the first client vehicle and provides location data associated with the host parking spot to the first client vehicle.

2. The system in accordance with claim 1, wherein the control unit is further configured to:

receive, via the transceiver, a third signal from the first client vehicle, the third signal acknowledging acceptance of the host parking spot allocation; and display, within the host vehicle and after reception of the third signal, an indication that the host vehicle may depart the host parking spot.

3. The system in accordance with claim 1, wherein the control unit is further configured to:

determine if the first signal is received from a second client vehicle associated with a priority contact of the host vehicle; and allocate the host parking spot to the second client vehicle even if the second client vehicle is ranked lower than the first client vehicle on the parking priority ranking.

4. The system in accordance with claim 1, wherein the control unit is further configured to determine the host vehicle is ready to depart the host parking spot based on at least one of activation of the host vehicle, the host vehicle being activated for a predetermined amount of time, and shifting the host vehicle to a reverse mode.

5. The system in accordance with claim 1, wherein the control unit is further configured to determine the host vehicle is ready to depart the host parking spot based on a manual input from a passenger of the host vehicle.

6. The system in accordance with claim 1 further comprising a server configured to:

receive a third signal from a mobile device associated with a passenger of the at least one client vehicle, wherein the first signal indicates the at least one client vehicle is searching for a parking spot; and transmit a fourth signal to the mobile device, wherein the fourth signal notifies the first client vehicle that the host parking spot has been allocated to the first client vehicle, and provides location data associated with the host parking spot to the first client vehicle.

7. A system for use in determining parking spot allocation, the system comprising:

a client vehicle, the client vehicle comprising:

a transceiver configured for vehicle-to-vehicle communication; and a control unit configured to:

determine the client vehicle is searching for a parking spot;

transmit, via the transceiver, a first signal to a host vehicle parked in a host parking spot, wherein the first signal notifies the host vehicle that the client vehicle is searching for a parking spot;

transmit, via the transceiver, parking preference criteria data associated with the client vehicle;

receive, via the transceiver, a second signal from the host vehicle, wherein the second signal notifies the client vehicle the host parking spot is allocated to the client vehicle, wherein allocation of the host parking spot is determinable based on the parking preference criteria data; and transmit, via the transceiver, a third signal to the host vehicle, wherein the third signal provides acknowledgement to the host vehicle that the parking spot allocation is accepted by the client device.

8. The system in accordance with claim 7, wherein the control unit is further configured to transmit location data of the client vehicle, wherein an estimated time of arrival of the client vehicle to the host parking spot is determinable based on the location data.

9. The system in accordance with claim 7, wherein the control unit is further configured to determine the client vehicle is searching for a parking spot based on geolocation data associated with the client vehicle.

10. The system in accordance with claim 7, wherein the control unit is further configured to determine the client vehicle is searching for a parking spot based on a manual input from a passenger of the client vehicle.

11. The system in accordance with claim 7 further comprising a server configured to:

receive a fourth signal from a mobile device associated with a passenger of the client vehicle, wherein the fourth signal indicates the client vehicle is searching for a parking spot; and transmit a fourth signal to the mobile device, wherein the fourth signal notifies the client vehicle that the host parking spot has been allocated to the client vehicle, and provides location data associated with the host parking spot to the client vehicle.

12. A system for use in determining parking spot allocation, the system comprising:

a host vehicle parked in a host parking spot, the host vehicle comprising:

a transceiver configured for vehicle-to-vehicle communication; and a control unit configured to:

receive, via the transceiver, a first signal from a plurality of client vehicles, wherein the first signal indicates at least one client vehicle is searching for a parking spot;

determine a parking priority ranking for the plurality of client vehicles;

allocate the host parking spot to a first client vehicle of the plurality of client vehicles based on the parking priority ranking; and transmit, via the transceiver, a second signal to the first client vehicle, wherein the second signal notifies the first client vehicle that the host parking spot has been allocated to the first client vehicle, and provides location data associated with the host parking spot to the first client vehicle.

13. The system in accordance with claim 12, wherein the control unit is further configured to:

receive, via the transceiver, a third signal from the first client vehicle, the third signal acknowledging acceptance of the host parking spot allocation; and display, within the host vehicle and after reception of the third signal, an indication that the host vehicle may depart the host parking spot.

14. The system in accordance with claim 12, wherein the control unit is configured to:

determine the parking priority ranking for the plurality of vehicles based on at least one of an estimated time of arrival to the host parking spot or an order in which the first signal is received from each client vehicle.

15. The system in accordance with claim 14, wherein the control unit is further configured to:
- determine if the first signal is received from a second client vehicle associated with a priority contact of the host vehicle; and
- allocate the host parking spot to the second client vehicle even if the second client vehicle is ranked lower than the first client vehicle on the parking priority ranking.

16. The system in accordance with claim 12, wherein the control unit is further configured to determine the host vehicle is ready to depart the host parking spot based on at least one of activation of the host vehicle, the host vehicle being activated for a predetermined amount of time, or shifting the host vehicle to a reverse mode.

17. The system in accordance with claim 12, wherein the control unit is further configured to process the first signal when the host vehicle is ready to depart the host parking spot.

18. The system in accordance with claim 12 further comprising a server configured to:
- receive a third signal from a mobile device associated with a passenger of the at least one client vehicle, wherein the first signal indicates the at least one client vehicle is searching for a parking spot; and
- transmit a fourth signal to the mobile device, wherein the fourth signal notifies the first client vehicle that the host parking spot has been allocated to the first client vehicle, and provides location data associated with the host parking spot to the first client vehicle.

\* \* \* \* \*